United States Patent
Hirs

(10) Patent No.: US 6,319,400 B1
(45) Date of Patent: Nov. 20, 2001

(54) DEEP BED FILTRATION SYSTEM

(76) Inventor: Gene Hirs, 3822 W. 13 Mile Rd., Apt. D, Royal Oak, MI (US) 48073

( * ) Notice: Subject to any disclaimer, the term of this patent is extended or adjusted under 35 U.S.C. 154(b) by 0 days.

(21) Appl. No.: 09/691,519

(22) Filed: Oct. 18, 2000

(51) Int. Cl.[7] .................................................. B01D 24/46
(52) U.S. Cl. ................................... 210/275; 210/290
(58) Field of Search ................................... 210/290, 275

(56) References Cited

U.S. PATENT DOCUMENTS

| | | | |
|---|---|---|---|
| 3,814,245 | * 6/1974 | Hirs | 210/290 |
| 3,814,247 | 6/1974 | Hirs | 210/793 |
| 3,900,395 | * 8/1975 | Hirs | 210/290 |
| 4,048,068 | 9/1977 | Hirs | 210/793 |
| 4,197,205 | 4/1980 | Hirs | 210/275 |
| 4,197,208 | 4/1980 | Hirs | 210/506 |

* cited by examiner

*Primary Examiner*—Ivars Cintins
(74) *Attorney, Agent, or Firm*—Laurence C. Begin; Dinnin & Dunn P.C.

(57) ABSTRACT

A deep bed filter principally used for filtration of contaminated aqueous fluid comprises a layer of polymeric cylindrical particles in combination with a layer of anthracite particles and a layer of sand. The polymeric cylindrical particles are approximately 1.5 millimeters in diameter and in the range of 6–12 millimeters high, with a specific gravity of approximately 1.15. When the filter is backwashed particles of anthracite mix with a portion of the polymeric particle layer, thereby creating larger surface voids for penetration of larger contaminant particles into the filter.

5 Claims, 2 Drawing Sheets

DEEP BED FILTRATION SYSTEM

This instant invention is generally related to deep bed filtration systems as taught in U.S. Pat. Nos. 3,814,247, 3,900,395, 4,048,068, 4,197,205 and 4,197,208, all to Hirs.

BACKGROUND OF THE INVENTION

Field of the Invention

The instant invention relates generally to an improved deep-bed filter used for filtering water, sewage or other aqueous liquids, and specifically to an improved apparatus and method for liquid filtration utilizing a polymeric filtration media layer for enhanced contaminant filtration with minimum pressure drop through the filter.

The concept of liquid filtration utilizing multimedia deep bed filters is well known in the art. Prior art filters often employ layers of granular media from the coarsest to the finest for efficient filter operation. While most suspended contaminants can be removed from a liquid by filtering through a deep enough bed of fine granular filter media, a high pressure drop across the filter and the necessity of frequent filter backwashing to remove surface contaminant buildup render such filters impractical for use in municipal and industrial filtration applications where tremendous volume and contaminant concentrations exist.

Additionally, deep bed filters often have difficulty handling peak or emergency loads without over-design of the filter or the addition of an auxiliary filter to handle the extra contaminant load. Simply adding layers of filtration media to existing deep bed filters to solve the aforementioned problems is ineffective. Furthermore, backwashing many prior art filters having media of varying particle sizes but identical specific gravities results in a reversal of the media grading order, i.e., from small to large.

This reverse gradation problem has been solved to some degree by using media materials having differing specific gravities. However, even when using materials of such different specific gravities as anthracite and sand, if the granules of coal are large enough they will stratify at lower levels within the filter bed. These aforementioned dual media filters are generally used to handle increased turbidity loads and will provide longer periods of filter operation between backwashing. However, when turbidity gets very high and coagulants must be used these filters are still subject to surface binding, thereby requiring frequent backwashing.

The primary problem with known in the art dual media deep bed filters is that large coagulated particles and floc that are larger than the voids in the top layers of media are strained at the surface instead of passing into the depth of the media. This buildup of surface contaminants on the filter causes pressure buildup on the filter surface, thereby restricting flow of high turbidity liquids and preventing effective use of adequate chemical flocculating agents. Furthermore, during filter backwashing media classification takes place and the coal fines settle at the surface of the filter, thereby closing off any voids and further restricting fluid flow through the filter.

SUMMARY OF THE INVENTION

The instant invention utilizes an additional filtration media layer that is both larger and lighter than anthracite disposed thereabove. This upper media layer mixes with coal fines to enhance and maintain interstitial sites at the filter surface and throughout the mixed strata. Furthermore, this media is comprised of a plurality of cylindrical polymeric particles, each cylinder having a carefully selected diameter to maximize mixing with the finer coal particles subsequent to filter backwashing. This uppermost media strata prevents excessive buildup of contaminants on the surface of the deep bed filter, thereby enhancing fluid flow therethrough, even during periods of high contaminant loading. Other uses and advantages of the instant invention will become apparent from the detailed description of the preferred embodiments below in conjunction with the accompanying drawing Figures.

BRIEF DESCRIPTION OF THE DRAWINGS

FIG. 3 is a graph of deep bed filter performance curves.

DETAILED DESCRIPTION OF THE PREFERRED EMBODIMENTS

Figure 1:
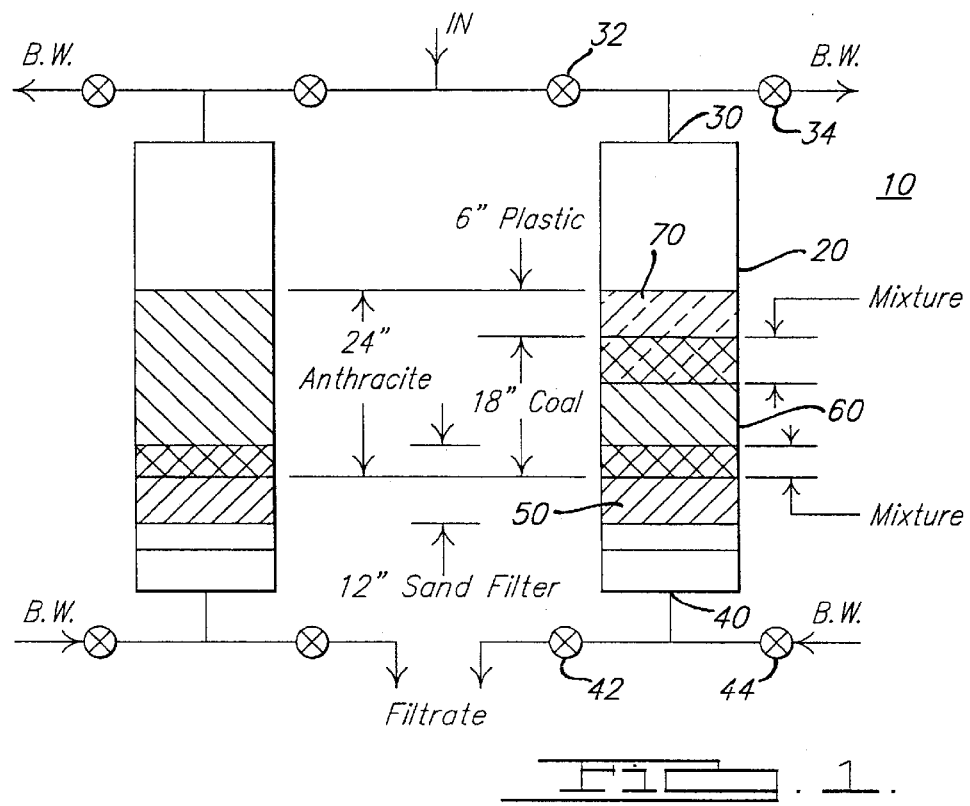
FIG. 1 is a schematic view of a prior art deep bed filter and a deep bed filter in accordance with the instant invention.

Referring now to FIG. 1 and in accordance with a preferred embodiment of the instant invention an improved deep bed filter comprises a vessel 20 having a fluid inlet 30 and a fluid outlet 40. The vessel 20 may be any known in the art filter container or containment area capable of accepting a contaminant to be filtered. The inlet 30 supplies contaminated fluid to the filter 10, and is in fluid communication with an inlet valve 32 and a backwash valve 34. Similarly, the outlet 40 is in fluid communication with both an outlet valve 42 and a backwash valve 44. When filter 10 backwashing is desired, both the inlet and outlet valves 32, and 42 respectively, are closed, and both backwash valves 34 and 44 are opened, to allow fluid to be pumped from the bottom of the filter 10 to the top thereof.

The vessel 20 contains three layers of filter media, a layer of sand 50, over which is placed a layer of anthracite 60 (coal), over which is placed a layer of polymeric particles 70. The polymeric particles 70 are cylindrical in shape, having a diameter of 1.5 mm and a length of 6 to 12 mm. Furthermore, the polymeric particles 70 preferably have a specific gravity of approximately 1.15. The cylindrical shape and specific gravity of the particles 70 are selected to allow settling thereof at a rate which permits mixing with the finer anthracite particles 60 as the filter media layers settle subsequent to backwashing. The sand layer 50 is not required for the filter 10 of the instant invention, but is often utilized in high contaminant load filtration applications.

Figure 2:
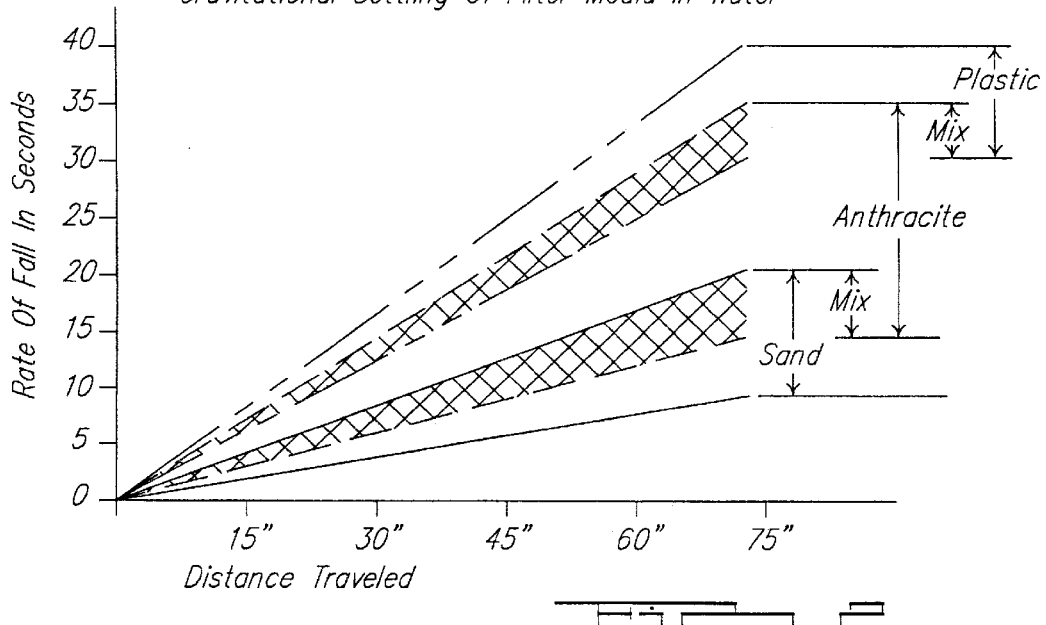
FIG. 2 is a graph if gravitational settling rates for a plurality of filter media materials.
Figure 2:
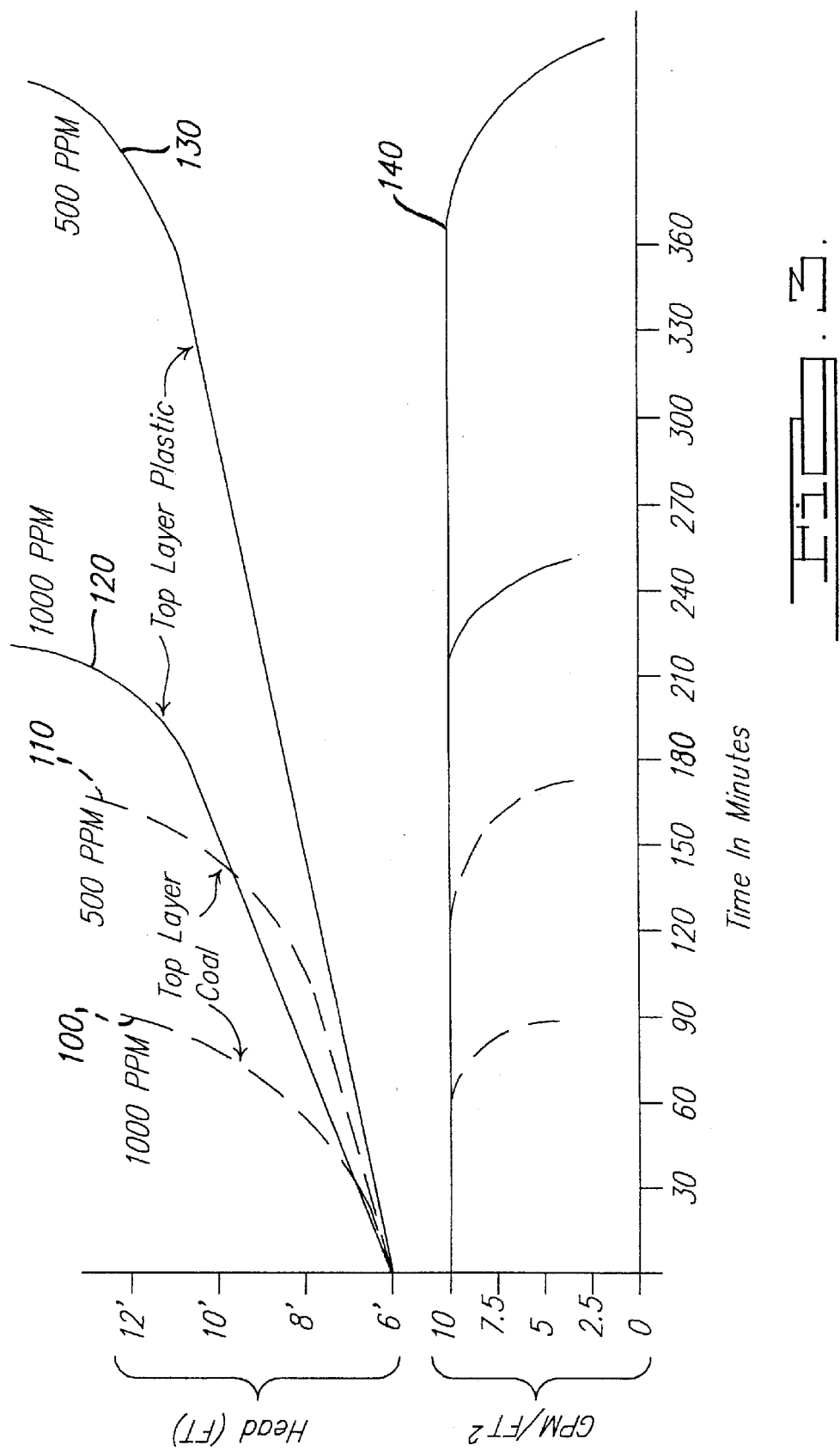

FIG. 2 illustrates the results of gravitational settling of the three filter media layers in water as a function of settling time. The cylindrical polymeric particles 70 mix well with the upper layer of anthracite particles 60. This feature of the instant invention provides a significant improvement over prior art deep bed filtration systems.

Since the upper portion of the anthracite particles 60 tend to be relatively small and flat or micaceous, filter 10 surface loading often occurs when high concentrations of organic contaminants or chemical flocs are present in the fluid to be filtered. The mixing action of the cylindrical polymeric particles 70 with the finer anthracite particles 60 creates a plurality of voids or interstices in the filter 10 surface layer. These voids permit contaminant penetration into the filter 10, thereby greatly enhancing filter efficiency due to significantly decreased surface loading.

The selection of size, shape, and specific gravity of the polymeric particles 70 is crucial to proper filter operation.

The polymeric particle 70 characteristics are selected to provide a desired amount of mixing with the anthracite particles 60 to facilitate filter penetration. For example, prior art spherical polymeric particles are less desirable for use in deep bed filters because the rate of settling of a sphere is too great, thereby causing the particles to settle to the filter bottom.

Since a cylinder has a higher area to volume ratio than a corresponding spherical particle, and therefore settles at a much slower rate, cylindrical particles are superior for use as a top media layer. Furthermore, polymeric particles having a specific gravity of 1.15 have an ideal settling rate to facilitate mixing with the anthracite particles 60. Specifically, nylon rods having a specific gravity of 1.15 are commercially available and are readily cut into cylindrical particles 70 of appropriate size.

Referring now to FIG. 3, a plurality of filter performance curves are shown for both a conventional sand-coal deep bed filter and a sand-coal-polymeric particle filter 10 in accordance with the instant invention. The dashed line curves 100 and 110 represent filter performance of a sand-coal prior art filter. The solid line curves 120 and 130 represent filter performance of the sand-coal-polymeric particle filter of the instant invention.

Two simultaneous filtration tests were conducted using each filter, one with a 500 ppm contaminant concentration of 0–50 micron Arizona dust, and one with a 1000 ppm concentration. Each filter utilized a sand layer and an anthracite layer having particle sizes of 0.4 to 0.7 mm. The conventional filter utilized a 12 inch deep sand bed covered with a 24 inch anthracite bed. The filter constructed in accordance with the instant invention utilized a 12 inch deep sand bed, an 18 inch deep anthracite bed, and a 6 inch deep top layer of polymeric cylindrical particles having a specific gravity of 1.15.

In each test, the filters were subject to a constant head of 18 ft., while contaminant flow rates (indicated by the curve 140) were maintained at a constant 10 gpm/ft$^2$. Additionally, 150 ppm of alum was used as a flocculating agent and 1 ppm of polyelectrolyte was used to strengthen the floc.

As readily discerned from FIG. 3, the initial pressure drop across the filters in each test was approximately 6 ft. In both the 500 and 1000 ppm contaminant test, the polymer particle-coal-sand filter significantly outperformed the conventional coal-sand filter. For example, at 500 ppm contaminant concentration, the filter of the instant invention operated for nearly three times as long as the conventional filter (approximately 125 minutes compared to approximately 360 minutes) before the flow rate was incapable of being maintained at 10 gpm/ft$^2$. In each test, effluent turbidity was tested every 15 minutes and remained undetectable at less than 1 ppm.

Backwashing of the polymer particle-coal-sand filter was accomplished at a flow rate of 15 gpm/ft$^2$ and resulted in significant mixing of the polymeric particles 70 with the anthracite particles 60, as shown in FIG. 1 by the overlap of the two media strata. A portion of polymeric cylindrical particles 70 remained above the anthracite particles 60 after repeated backwashing, enabling enhanced contaminant penetration, in contradistinction to known in the art deep bed filters.

While the preferred embodiments of the invention have been described in detail, it will be appreciated by one of ordinary skill in the art that the instant invention is susceptible of various modifications without departing from the scope of the following claims.

I claim:

1. A deep bed filter comprising:

a first layer of anthracite particles;

a second layer of cylindrical polymeric particles superimposed over said layer of anthracite particles, said cylindrical particles having a diameter of approximately 1.5 millimeters, a height in the range of 6 to 12 millimeters, and a specific gravity of approximately 1.15; and a third layer intermediate of said first and second layers wherein said third layer comprises a significant mixture of said cylindrical polymeric particles and said anthracite particles.

2. A deep bed filter as claimed in claim 1 wherein said polymeric particles are comprised of nylon.

3. A deep bed filter as claimed in claim 1 further comprising a layer of sand disposed below said layer of anthracite.

4. A deep bed filter comprising:

a first layer of anthracite particles;

a second layer of cylindrical polymeric particles superimposed over said layer of anthracite particles, said cylindrical particles having a diameter of approximately 1.5 millimeters, a height in the range of 6 to 12 millimeters, and a specific gravity of approximately 1.15; and a third layer intermediate of said first and second layers wherein said third layer comprises a significant mixture of said cylindrical polymeric particles and said anthracite particles said mixture formed upon backwashing of said first and second layers.

5. A deep bed filter comprising:

a first layer of anthracite particles;

a second layer of cylindrical polymeric particles superimposed over said layer of anthracite particles, said cylindrical particles having a diameter of approximately 1.5 millimeters, a height in the range of 6 to 12 millimeters, and a specific gravity of approximately 1.15; and a means for backwashing the first and second layers to form a significant mixture of said first and second layers, said mixture intermediate of said first and second layers.

\* \* \* \* \*